United States Patent Office 2,961,397
Patented Nov. 22, 1960

2,961,397

PREVENTING DEPOSITION OF WAX ON EQUIPMENT DURING DEWAXING BY UTILIZING SMOOTH SURFACE EQUIPMENT AND A SURFACE-ACTIVE AGENT

Arthur D. Moscrip, Swarthmore, Pa., assignor to Sun Oil Company, Philadelphia, Pa., a corporation of New Jersey No Drawing. Filed Dec. 21, 1955, Ser. No. 554,412

3 Claims. (Cl. 208—33)

This invention relates to preventing deposition of wax from liquids containing the same, on surfaces with which the wax-containing liquid comes in contact.

In various industrial processes, liquid materials containing wax, usually in solution, are contacted with surfaces of equipment, conduits, etc., under conditions such that there is a tendency for the wax to deposit on these surfaces. Frequently, this is a highly objectionable circumstance, and it would be desirable to avoid such deposition.

The above problem is encountered, for example, in the petroleum industry, in processes for separating wax from mixtures thereof with oil, the separation being performed in the presence of a solvent for the oil. In such processes, it is customary procedure to dissolve the mixture of wax and oil in a suitable solvent, of which many are well known, then cool the resulting solution to a temperature at which a substantial amount of wax is separable from the solution as a solid phase, and then separate the wax phase by suitable means such as filtration or centrifuging. In such processes, the cooling is frequently performed by passing the wax-containing solution through heat exchanger tubes in order to extract heat from the solution by means of a suitable cooling medium. It frequently occurs that the deposition of wax upon the inner surfaces of the heat exchanger tubes is so great as to provide serious operating problems. In an attempt to overcome these problems, it has been proposed to employ heat exchangers which are continuously scraped by suitable means to prevent deposition of wax or remove deposited wax. However such apparatus is expensive, and presents operating problems itself which it would be preferable to avoid.

According to the present invention, deposition of wax upon surfaces with which wax-containing liquids come in contact is inhibited or prevented in an economical and satisfactory manner. The present invention involves first the incorporation in the wax-containing liquid of a minor amount of a surface active agent, and involves further the use, at places where ordinarily deposition of wax would occur, of surfaces for containing or conveying the liquid, which surfaces are smoother than those of apparatus conventionally employed, their smoothness being such that the average (root mean square) surface irregularity is not substantially greater than 0.00005 inch (5/100,000 of an inch). Thus, the average distance between the tops of "peaks" and the bottoms of "valleys" in the metal surface employed is not greater than 0.00005 inch. Various methods for determining average surface irregularity are known in the art, as described for example by M. C. Shaw et al. in "Analysis and Lubrication of Bearings," pp. 441 to 446 (1949). The "Profileometer" method described on page 443 of that book is a representative method.

The surface employed according to the invention may be constructed of any suitable material, of which glass and various plastic materials are particularly suitable examples. Polystyrene plastic materials are well adapted to the preparation of extremely smooth surfaces, and various other plastic materials can also be employed, for example polyvinyl chloride, phenol-formaldehyde plastics, etc. Metal surfaces are for the most part too rough to be employed according to the invention. However, highly polished metal surfaces may in some instances be sufficiently smooth, as for example in the case of lapped and polished steel.

In any event, the smoothness of the surfaces employed is quite substantially greater than that of equipment commonly used in the handling of wax-containing liquids. These abnormally smooth surfaces are used according to the invention at places where deposition of wax would ordinarily occur, for example at the heat exchanger surfaces referred to previously with regard to separation of wax from oil in the presence of a solvent. Thus, glass lined or plastic lined heat exchanger tubes for example can be employed in such operations.

The use of abnormally smooth surfaces according to the invention permits obtaining highly satisfactory results with only quite small amounts of surface active agent, and also prevents excessive deposition of wax in cases where the conditions tend so greatly to cause deposition of wax that, with ordinary rough surfaces, excessive deposition could not be prevented even with large amounts of surface active agent.

It is essential according to the invention that, in addition to the provision of abnormally smooth surfaces, a surface active agent be incorporated in the liquid which comes in contact with these surfaces. It is believed that the surface active agent forms a film on the metal surface, which film inhibits or prevents the deposition of wax from the liquid on the metal surface. The surface must be abnormally smooth in order to provide the particularly good inhibition of deposition according to the invention, and it is believed that the reason for this necessity is that otherwise the thin film of surface active agent does not uniformly cover the surfaces of the equipment, and because of this lack of uniformity deposition of wax occurs at the locations which are not covered.

Surface active agents are suitable as a class for use according to the present invention. The nature of surface active agents is well known, and such agents generally have an oleophilic portion of the molecule, usually of hydrocarbon nature, and another, polar portion of the molecule, which may be provided by various functional groups such as hydroxyl, sulfate, carboxyl, carbonyl, amino, nitro, amido, ether, sulfonate, phosphate, phosphite, etc. Examples of suitable classes of surface active agents which can be employed are: alkali metal salts of fatty acids, alkali metal salts of sulfated fatty acids, fatty acid glycerides, sulfonated or sulfated fatty acid esters or amides, alkali metal alkyl sulfates, alkali metal alkyl sulfonates, alkali metal aryl sulfonates, alkali metal alkylaryl sulfonates, quaternary ammonium halides, alkali metal salts of alkylated naphthalene sulfonic acid, polyethylene sorbitol esters of fatty acids, fatty acid amides of alkanol amines, condensation products of ethylene oxide and polyalkylene glycols, sorbitan esters, alkyl substituted phosphoric acids, alkali metal salts of alkyl phenol sulfonates, etc. Examples of individual surface active agents which can be employed are given for example in Kirk et al., Encyclopedia of Chemical Technology, vol. 13, pages 515–517 (1954).

Particularly suitable surface active agents for use according to the invention are the quaternary ammonium halides, of which numerous examples are given in the Kirk et al. disclosure referred to in the preceding paragraph.

The surface active agent employed according to the present invention is incorporated in a wax-containing liquid in an amount within the approximate range from 0.01 to 10 weight percent based on total solution. Preferably, the amount employed does not exceed 1.0 weight percent, and more preferably the amount does not exceed 0.1 weight percent. The surface active agent is preferably added in substantially anhydrous form.

The invention is advantageously applied in situations where it is desired to prevent or inhibit deposition of wax from liquids containing the same on surfaces with which the liquid comes in contact. Particularly advantageous uses of the invention are found in solvent dewaxing of mineral oils and solvent de-oiling of petroleum waxes. Any of the well known dewaxing or de-oiling solvents can be employed in such processes. Mixtures of methyl ethyl ketone, benzene and toluene are commonly employed solvents for such processes. Another common solvent for such processes is propane; trichloroethylene and mixtures of benzene with ethylene trichloride are also advantageously used. Other suitable solvents include butane, pentane, butenes, naphtha, gasoline, benzene, carbon tetrachloride, acetone, mixtures of the above, etc. The amount of wax in the solution is frequently within the approximate range from 5 to 20 weight percent, though lesser amounts may be present in some cases.

The following example illustrates the invention:

One volume of a paraffinic distillate wax having a melting point of about 130° F. was dissolved at a temperature of 140° F. in 14 volumes of a conventional de-oiling solvent containing methyl ethyl ketone, benzene and toluene, and the resulting solution was pumped through a glass, water-cooled condenser, the average irregularity in the glass surfaces being substantially less than 0.00005 inch. Deposition of wax on the heat exchanger surfaces occurred rapidly under these conditions, and the condenser immediately became plugged with wax so that the wax-containing liquid could not be pumped through it. However, in another experiment carried out in like manner, but with incorporation of 0.05 weight percent of a surface active agent in the solution, deposition of wax was substantially avoided, and the solution was pumped through the condenser without plugging.

The surface active agent employed was a dialkyl dimethyl ammonium chloride in which the two alkyl groups other than methyl were derived from cocoa fatty acids.

This example shows that the incorporation of a small amount of a surface active agent in a wax-containing solution provides, in combination with the use of extremely smooth surfaces, a highly satisfactory inhibition of deposition of wax from the solution.

The invention claimed is:

1. Process for separating wax from oil which comprises: cooling a homogeneous liquid material, which remains homogeneous after said cooling comprising mainly a solution of petroleum oil and wax in a solvent for petroleum oil and containing 0.01 to 10 weight percent of a surface active agent having an oleophilic portion and a polar portion in the molecule and adapted to form a film on surfaces of equipment with which the liquid material is contacted, thereby to form solid wax in said liquid material; separating said solid wax from excess liquid; and prior to said separating, contacting said liquid material containing solid wax with surfaces having irregularity not substantially greater than 0.00005 inch.

2. Process according to claim 1 wherein said solvent is selected from the group consisting of ketones, hydrocarbons, chlorohydrocarbons and mixtures thereof.

3. Process according to claim 1 wherein during said cooling, said liquid material is contacted with surfaces all having irregularity not substantially greater than 0.00005 inch.

References Cited in the file of this patent

UNITED STATES PATENTS

| 1,571,943 | Hall et al. | Feb. 9, 1926 |
| 2,658,854 | Myers et al. | Nov. 10, 1953 |
| 2,698,279 | Mondria | Dec. 28, 1954 |
| 2,721,829 | Mondria | Oct. 25, 1955 |
| 2,791,539 | Mondria et al. | May 7, 1957 |
| 2,793,169 | Mondria et al. | May 21, 1957 |
| 2,848,372 | Knox et al. | Aug. 19, 1958 |